(12) United States Patent
Miller et al.

(10) Patent No.: US 7,682,536 B2
(45) Date of Patent: *Mar. 23, 2010

(54) METHOD OF MAKING A MICROPOROUS MATERIAL

(75) Inventors: Eric H. Miller, Philpot, KY (US); Joseph G. Yaritz, Utica, KY (US); Mark T. Demeuse, Charlotte, NC (US); J. Kevin Whear, Utica, KY (US)

(73) Assignee: Daramic LLC, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/199,079

(22) Filed: Aug. 27, 2008

(65) Prior Publication Data

US 2008/0315447 A1  Dec. 25, 2008

Related U.S. Application Data (62) Division of application No. 11/006,333, filed on Dec. 7, 2004, now Pat. No. 7,445,735.

(51) Int. Cl.
*B01D 67/00* (2006.01)
*B29C 67/20* (2006.01)

(52) U.S. Cl. ........................ 264/49; 264/288.8; 264/344

(58) Field of Classification Search .................... 264/41, 264/49, 344, 288.4, 288.8; 428/317.9
See application file for complete search history.

(56) References Cited

U.S. PATENT DOCUMENTS

| | | | |
|---|---|---|---|
| 2,940,830 A | 6/1960 | Thornhill | |
| 3,351,495 A | 11/1967 | Larsen et al. | |
| 4,600,633 A | 7/1986 | Kono et al. | |
| 4,833,172 A | 5/1989 | Schwarz et al. | |
| 4,861,644 A | 8/1989 | Young et al. | |
| 4,997,603 A | 3/1991 | Kafchinski et al. | |
| 5,051,183 A | 9/1991 | Takita et al. | |
| 6,120,939 A | 9/2000 | Whear et al. | |
| 6,558,591 B2 | 5/2003 | Calis | |
| 7,445,735 B2 * | 11/2008 | Miller et al. | 264/49 |
| 2003/0022068 A1 | 1/2003 | Pekala et al. | |
| 2003/0087141 A1 | 5/2003 | Sun et al. | |

OTHER PUBLICATIONS

U.S. Appl. No. 11/719,344, filed May 15, 2007, Miller et al.
U.S. Appl. No. 11/854,580, filed Sep. 13, 2007, Miller et al.

* cited by examiner

*Primary Examiner*—Jill L Heitbrink
(74) *Attorney, Agent, or Firm*—Hammer & Associates, P.C.

(57) ABSTRACT

A method for producing a microporous material comprising the steps of: providing an ultrahigh molecular weight polyethylene (UHMWPE); providing a filler; providing a processing plasticizer; adding the filler to the UHMWPE in a mixture being in the range of from about 1:9 to about 15:1 filler to UHMWPE by weight; adding the processing plasticizer to the mixture; extruding the mixture to form a sheet from the mixture; calendering the sheet; extracting the processing plasticizer from the sheet to produce a matrix comprising UHMWPE and the filler distributed throughout the matrix; stretching the microporous material in at least one direction to a stretch ratio of at least about 1.5 to produce a stretched microporous matrix; and subsequently calendering the stretched microporous matrix to produce a microporous material which exhibits improved physical and dimensional stability properties over the stretched microporous matrix.

17 Claims, 5 Drawing Sheets

METHOD OF MAKING A MICROPOROUS MATERIAL

RELATED APPLICATION

This application is a divisional application based upon U.S. patent application Ser. No. 11/006,333 filed Dec. 7, 2004, now U.S. Pat. No. 7,445,735.

BACKGROUND OF THE INVENTION

1. Field of the Invention

The present application discloses a microporous membrane and a method for making the same.

2. Description of the Prior Art

A microporous membrane comprising a very high molecular weight polyolefin and an inert filler material was taught by Larsen, U.S. Pat. No. 3,351,495. The general principles and procedures of U.S. Pat. No. 3,351,495 are incorporated herein by reference.

Kono et al., U.S. Pat. No. 4,600,633 teaches a polyethylene superthin film and a process for the production of the same. In this process an ultra high molecular weight polyethylene (herein after UHMWPE) is dissolved in a solvent then extruded to form a gel sheet. The gel sheet then undergoes a first extraction step to remove the solvent. After the first extraction, the sheet is heated and stretched. The stretched sheet then undergoes a second extraction step to remove solvent. The resulting product then undergoes a compression treatment at a temperature of 80° to 140° centigrade. This reference does not use a filler in its UHMWPE. The gel sheet is not calendered prior to solvent extraction. The resulting product is a thin film with a tensile modulus of at least 2000 kg/cm$^2$ a breaking strength of at least 500 kg/cm$^2$ and which, is substantially free from pores.

Schwarz et al., U.S. Pat. No. 4,833,172 teaches a stretched microporous material. In this process an UHMWPE and a siliceous filler are dissolved in a plasticizer then extruded to form a gel sheet. In this process the gel sheet may optionally be calendered prior to a solvent extraction. The gel sheet then undergoes a solvent extraction to remove the plasticizer. After the extraction, the sheet is then stretched.

SUMMARY OF THE INVENTION

A method for producing a microporous material comprising the steps of: providing an ultrahigh molecular weight polyethylene (herein after UHMWPE); providing a particulate filler; and providing a processing plasticizer where the processing plasticizer is typically a liquid at room temperature. The filler and the UHMWPE and the processing plasticizer are mixed, the resulting mixture may comprise from about 1:9 to about 15:1 filler to UHMWPE by weight. The resulting mixture is then extruded and immediately processed (either calendered, blown or cast) to form a sheet. The formed sheet is then subjected to an extraction step, where the plasticizer is partially (or fully) removed. The resulting sheet is a matrix which comprises UHMWPE, oil (if not fully extracted), and the filler. The extraction step has rendered this matrix microporous. The filler is distributed throughout this microporous matrix, with the filler constituting from 5 percent to 95 percent by weight of the microporous matrix. The microporous matrix has a network of interconnecting pores communicating throughout the microporous matrix. The pores constitute from 25 percent to 90 percent by volume of the microporous matrix. Then, this microporous matrix is stretched. This produces a stretched microporous matrix that is not very dimensionally stable at elevated temperature. The stretched microporous matrix is then calendered to produce a final microporous material with much improved dimensional stability and physical properties.

BRIEF DESCRIPTION OF THE DRAWINGS

For the purpose of illustrating the invention, there is shown in the drawings information about some of the embodiments of the invention; it being understood, however, that this invention is not limited to the precise information shown.

DETAILED DESCRIPTION OF THE INVENTION

A method for producing a microporous material comprising the steps of: providing an ultrahigh molecular weight polyethylene (herein after UHMWPE); providing a particulate filler; and providing a processing plasticizer where the processing plasticizer is a liquid at room temperature. The UHMWPE, filler and plasticizer are all described in greater detail below. The UHMWPE, filler and plasticizer are mixed together to form a mixture. The mixture is extruded through a die (e.g. slot die or blown film die) to form a sheet. The sheet maybe further processed, by casting onto a chilled roller, or calendered, or blown. The cast or calendered sheet is then subjected to an extraction step to partially (or fully) remove the plasticizer and forms thereby a microporous matrix. The matrix comprises UHMWPE, plasticizer if not fully extracted, and the particulate filler distributed throughout the matrix. The filler constitutes from 5 percent to 95 percent by weight of the microporous matrix. The microporous matrix has a network of interconnecting pores communicating throughout the microporous matrix. The pores constitute from 25 percent to 90 percent by volume of the microporous matrix. The microporous matrix is stretched. The stretching process is described in greater detail below. The stretched microporous matrix is not dimensionally stable at elevated temperatures. The stretched microporous matrix is subsequently calendered to produce the final microporous material that is dimensionally stable even at elevated temperatures.

Ultrahigh molecular weight polyethylene (UHMWPE) can be defined as a polyethylene having an intrinsic viscosity of least about 18 deciliters/gram. In many cases the intrinsic viscosity is at least about 19 deciliters/gram. Although there is no particular restriction on the upper limit of the intrinsic viscosity, the intrinsic viscosity is frequently in the range of from about 18 to about 39 deciliters/gram. An intrinsic viscosity in the range of from about 18 to about 32 deciliters/gram is most common.

As used herein and in the claims, intrinsic viscosity is determined by extrapolating to zero concentration the reduced viscosities or the inherent viscosities of several dilute solutions of the UHMWPE where the solvent is freshly distilled decahydronaphthalene to which 0.2 percent by weight, 3,5-di-tert-butyl-4-hydroxyhydrocinnamic acid, neopentanetetrayl ester [CAS Registry No. 6683-19-8] has been added. The reduced viscosities or the intrinsic viscosities of the UHMWPE are ascertained from relative viscosities obtained at 135° C. using an Ubbelohde No. 1 viscometer in accordance with the general procedures of ASTM D 4020-81, except that several dilute solutions of differing concentration are employed. ASTM D 4020-81 is, in its entirety, incorporated herein by reference.

Sufficient UHMWPE should be present in the matrix to provide its properties to the microporous material. Other thermoplastic organic polymers may also be present in the matrix, so long as their presence does not materially affect the properties of the microporous material in an adverse manner. The amount of the other thermoplastic polymers which may be present depends upon the nature of such polymers. In general, a greater amount of other thermoplastic organic polymer may be used if the molecular structure contains little branching, few long sidechains, and few bulky side groups, than when there is a large amount of branching, many long sidechains, or many bulky side groups. For this reason, the exemplary thermoplastic organic polymers that may be mixed with the UHMWPE are low density polyethylene, high density polyethylene, poly(tetrafluoroethylene), polypropylene, copolymers of ethylene, such as ethylene-butene or ethylene-hexene, copolymers of propylene, copolymers of ethylene and acrylic acid, and copolymers of ethylene and methacrylic acid. If desired, all or a portion of the carboxyl groups of carboxyl-containing copolymers may be neutralized with sodium, zinc or the like. Usually at least about 70 percent UHMWPE (or 70 percent UHMWPE and other thermoplastic organic polymers), based on the weight of the matrix, will provide the desired properties to the microporous material.

The particulate filler may be in the form of ultimate particles, aggregates of ultimate particles, or a combination of both. In most cases, at least about 90 percent by weight of the filler has gross particle sizes in the range of from about 5 to about 40 micrometers. If the filler used is titanium dioxide (TiO2) the gross particle size can range from 0.005 to 45 micrometers. In another embodiment using titanium dioxide (TiO2) as a filler, the gross particle size ranges from 0.1 to 5 micrometers. In another case, at least about 90 percent by weight of the filler has a gross particle size in the range of from about 10 to about 30 micrometers. It is expected that filler agglomerates will be reduced in size during processing of the ingredients. Accordingly, the distribution of gross particle sizes in the microporous material may be smaller than in the raw filler itself. Particle size is determined by use of a Model TAII Coulter counter (Coulter Electronics, Inc.) according to ASTM C 690-80, but modified by stirring the filler for 10 minutes in Isoton II electrolyte (Curtin Matheson Scientific, Inc.) using a four-blade, 4.445 centimeter diameter propeller stirrer. ASTM C 690-80 is, in its entirety, incorporated herein by reference.

The particulate filler will on average have an ultimate particle size (irrespective of whether or not the ultimate particles are agglomerated) which is less than about 30 micrometer as determined by transmission electron microscopy. Often the average ultimate particle size is less than about 0.05 micrometer. In one embodiment the average ultimate particle size of filler is approximately 20 micrometers (when a precipitated silica is used).

Use of fillers in a polymer matrix is well documented. In general examples of suitable fillers include siliceous fillers, such as: silica, mica, montmorillonite, kaolinite, asbestos, talc, diatomaceous earth, vermiculite, natural and synthetic zeolites, cement, calcium silicate, clay, aluminum silicate, sodium aluminum silicate, aluminum polysilicate, alumina silica gels, and glass particles. In addition to the siliceous fillers other particulate substantially water-insoluble fillers may also be employed. Examples of such optional fillers include carbon black, activated carbon, carbon fibers, charcoal, graphite, titanium oxide, iron oxide, copper oxide, zinc oxide, lead oxide, tungsten, antimony oxide, zirconia, magnesia, alumina, molybdenum disulfide, zinc sulfide, barium sulfate, strontium sulfate, calcium carbonate, and magnesium carbonate.

Silica and the clays are the most useful siliceous fillers. Of the silicas, precipitated silica, silica gel, or fumed silica is most often used.

The particulate filler which has been found to work well is precipitated silica. It is important to distinguish precipitated silica from silica gel, inasmuch as these different materials have different properties. Reference in this regard is made to R. K. Iler, The Chemistry of Silica, John Wiley & Sons, New York (1979), Library of Congress Catalog No. QD 181.S6144, the entire disclosure of which is incorporated herein by reference. Note especially pages 15-29, 172-176, 218-233, 364-365, 462-465, 554-564, and 578-579. Silica gel is usually produced commercially at low pH by acidifying an aqueous solution of a soluble metal silicate, typically sodium silicate, with acid. The acid employed is generally a strong mineral acid such as sulfuric acid or hydrochloric acid although carbon dioxide is sometimes used. Inasmuch as there is essentially no difference in density between gel phase and the surrounding liquid phase while the viscosity is low, the gel phase does not settle out, that is to say, it does not precipitate. Silica gel, then, may be described as a non-precipitated, coherent, rigid, three-dimensional network of contiguous particles of colloidal amorphous silica. The state of subdivision ranges from large, solid masses to submicroscopic particles, and the degree of hydration from almost anhydrous silica to soft gelatinous masses containing on the order of 100 parts of water per part of silica by weight, although the highly hydrated forms are only rarely used in the present invention.

Precipitated silica on the other hand, is usually produced commercially by combining an aqueous solution of a soluble metal silicate, ordinarily alkali metal silicate such as sodium silicate, and an acid so that colloidal particles will grow in weakly alkaline solution and be coagulated by the alkali metal ions of the resulting soluble alkali metal salt. Various acids may be used, including the mineral acids, but the preferred material is carbon dioxide. In the absence of a coagulant, silica is not precipitated from solution at any pH. The coagulant used to effect precipitation may be the soluble alkali metal salt produced during formation of the colloidal silica particles, it may be added electrolyte such as a soluble inorganic or organic salt, or it may be a combination of both. Precipitated silica, then, may be described as precipitated aggregates of ultimate particles of colloidal amorphous silica that have not at any point existed as macroscopic gel during the preparation. The sizes of the aggregates and the degree of hydration may vary widely.

Precipitated silica powders differ from silica gels in that they have been pulverized in ordinarily having a more open structure, that is, a higher specific pore volume. However, the specific surface area of precipitated silica as measured by the Brunauer, Emmett, Teller (BET) method using nitrogen as the adsorbate, is often lower than that of silica gel.

Many different precipitated silicas may be employed in the present invention, but the preferred precipitated silicas are those obtained by precipitation from an aqueous solution of sodium silicate using a suitable acid such as sulfuric acid or hydrochloric acid. Carbon dioxide can also be used to precipitate the silica. Such precipitated silicas are known and processes for producing them are described in detail in U.S. Pat. No. 2,940,830, the entire disclosure of which is incorporated herein by reference, including the processes for making precipitated silicas and the properties of the products.

In the proceeding process for producing a microporous matrix, extrusion and calendering are facilitated when the substantially water-insoluble filler carries much of the processing plasticizer. The capacity of the filler particles to absorb and hold the processing plasticizer is a function of the surface area of the filler. It is therefore preferred that the filler have a high surface area. High surface area fillers are materials of very small particle size, materials having a high degree of porosity or materials exhibiting both characteristics. Usually the surface area of the filler itself is in the range of from about 20 to about 400 square meters per gram as determined by the Brunauer, Emmett, Teller (BET) method according to ASTM C 819-77 using nitrogen as the adsorbate but modified by outgassing the system and the sample for one hour at 130° C. Preferably the surface area is in the range of from about 25 to about 350 square meters per gram. ASTM C 819-77 is, in its entirety, incorporated herein by reference. Inasmuch as it is desirable to essentially retain the filler in the microporous matrix sheet, it is preferred that the substantially water-insoluble filler be substantially insoluble in the processing plasticizer and substantially insoluble in the organic extraction liquid when microporous matrix sheet is produced by the above process.

The processing plasticizer is typically a liquid at room temperature and usually it is processing oil such as paraffinic oil, naphthenic oil, or an aromatic oil. Suitable processing oils include those meeting the requirements of ASTM D 2226-82, Types 103 and 104. It has been found that oils which have a pour point of less than 22° C. according to ASTM D 97-66 (reapproved 1978) work well. Oils having a pour point of less than 10° C. also work well. Examples of suitable oils include, but are not limited to, Shellflex® 412 and Shellflex® 371 oil (Shell Oil Co.) which are solvent refined and hydrotreated oils derived from naphthenic crude. ASTM D 2226-82 and ASTM D 97-66 (reapproved 1978) are, in the entireties, incorporated herein by reference. It is expected that other materials, including the phthalate ester plasticizers such as dibutyl phthalate, bis (2-ethylhexyl) phthalate, diisodecyl phthalate, dicyclohexyl phthalate, butyl benzyl phthalate, ditridecyl phthalate and waxes, will function satisfactorily as processing plasticizers. The processing plasticizer has little solvating effect on the thermoplastic organic polymer at 60° C., only a moderate solvating effect at elevated temperatures on the order of about 100° C., and a significant solvating effect at elevated temperatures on the order of about 200° C.

Minor amounts, usually less than about 5 percent by weight, of other materials used in processing such as lubricant, organic extraction liquid, surfactant, water, and the like, may optionally also be present. Yet other materials introduced for particular purposes may optionally be present in the microporous material in small amounts, usually less than about 15 percent by weight. Examples of such materials include antioxidants, ultraviolet light absorbers, flame retardants, reinforcing fibers such as carbon fiber or chopped glass fiber strand, dyes, pigments, and the like. The balance of the microporous material, exclusive of filler and any impregnate applied for one or more special purposes, is essentially the thermoplastic organic polymer and plasticizer (if not fully extracted).

Then the filler, thermoplastic organic polymer powder, processing plasticizer and other additives are mixed until a substantially uniform mixture is obtained. This uniform mixture may also contain other additives such as minor amounts of lubricant and antioxidant. The weight ratio of filler to polymer powder employed in forming the mixture is essentially the same as that of the stretched microporous material to be produced. The ratio of filler to UHMWPE in this mixture is in the range of from about 1:9 to about 15:1 filler to UHMWPE by weight. The particulate filler constitutes from about 5 percent to about 95 percent by weight of that microporous material. Frequently, such filler constitutes from about 45 percent to about 90 percent by weight of the microporous material. From about 55 percent to about 80 percent by weight is used in one of the embodiments of the invention. The ratio of the UHMWPE to the processing plasticizer is 1:30 to 3:2 by weight. Ratio of filler to processing plasticizer is 1:15 to 3:1 by weight.

In the extrusion and calendering process, the mixture, together with additional processing plasticizer, is introduced to the heated barrel of a screw extruder. Attached to the extruder is a sheeting die. A continuous sheet formed by the die is forwarded without drawing to a pair of heated calender rolls acting cooperatively to form continuous sheet of lesser thickness than the continuous sheet exiting from the die.

The continuous sheet is subjected to an extraction step where processing plasticizer is partially or fully removed there from. The extraction step may include one or more steps. For example, the continuous sheet from the calender then passes to a first extraction zone where the processing plasticizer is substantially removed by extraction with an organic liquid which is a good solvent for the processing plasticizer, a poor solvent for the organic polymer, and more volatile than the processing plasticizer. Usually, but not necessarily, both the processing plasticizer and the organic extraction liquid are substantially immiscible with water. There are many organic extraction liquids that can be used. Examples of suitable organic extraction liquids include but are not limited to hexane, alkanes of varying chain lengths, 1,1,2-trichloroethylene, perchloroethylene, 1,2-dichloroethane, 1,1,1-trichloroethane, 1,1,2-trichloroethane, methylene chloride, chloroform, isopropyl alcohol, diethyl ether and acetone. The continuous sheet then passes to a second extraction zone where the residual organic extraction liquid is substantially removed by: heat, steam and/or water. The continuous sheet is then passed through a forced air dryer for substantial removal of residual water and remaining residual organic extraction liquid. From the dryer the continuous sheet, which is a microporous matrix, is passed to a take-up roll.

The microporous matrix comprises a filler, UHMWPE, and optional materials in essentially the same weight proportions as those discussed above in respect of the stretched microporous matrix. The matrix might also have some plasticizer if it is not fully extracted. The residual processing plasticizer content is usually less than 20 percent by weight of the microporous matrix and this may be reduced even further by additional extractions using the same or a different organic extraction liquid.

In the microporous matrix, the pores constitute from about 25 to about 90 percent by volume. In many cases, the pores constitute from about 30 to about 80 percent by volume of the microporous matrix. One of the embodiments has from 50 to 75 percent of the volume of the microporous matrix is pores. The porosity of the microporous matrix, expressed as percent by volume. Unless impregnated, the porosity of the stretched microporous matrix is greater than the porosity of the microporous matrix before stretching.

As used herein and in the claims, the porosity (also known as void volume) of the microporous material, expressed as percent by volume, is determined according to the equation:

$$\text{Porosity} = 100[1 - d_1/d_2]$$

where $d_1$ is the density of the sample which is determined from the sample weight and the sample volume as ascertained from measurements of the sample dimensions and $d_2$ is the density of the solid portion of the sample which is determined from the sample weight and the volume of the solid portion of the sample. The volume of the solid portion of the sample can be determined using a Quantachrome stereopycnometer (Quantachrome Corp.) in accordance with the accompanying operating manual.

The volume average diameter of the pores of the microporous sheet can be determined by mercury porosimetry using an Autoscan mercury porosimeter (Quantachrome Corp.). Mercury Intrusion/Extrusion is based on forcing mercury (a non-wetting liquid) into a porous structure under tightly controlled pressures. Since mercury does not wet most substances and will not spontaneously penetrate pores by capillary action, it must be forced into the voids of the sample by applying external pressure. The pressure required to fill the voids is inversely proportional to the size of the pores. Only a small amount of force or pressure is required to fill large voids, whereas much greater pressure is required to fill voids of very small pores.

In operating the porosimeter, a scan is made in the high pressure range (from about 138 kilopascals absolute to about 227 megapascals absolute). If about 2 percent or less of the total intruded volume occurs at the low end (from about 138 to about 250 kilopascals absolute) of the high pressure range, the volume average pore diameter is taken as twice the volume average pore radius determined by the porosimeter. Otherwise, an additional scan is made in the low pressure range (from about 7 to about 165 kilopascals absolute) and the volume average pore diameter is calculated according to the equation:

$$d = 2\left[\frac{v_1 r_1}{w_1} + \frac{v_2 r_2}{w_2}\right] / \left[\frac{v_1}{w_1} + \frac{v_2}{w_2}\right]$$

where d is the volume average pore diameter, $v_1$ is the total volume of mercury intruded in the high pressure range, $v_2$ is the total volume of mercury intruded in the low pressure range, $r_1$ is the volume average pore radius determined from the high pressure scan, $r_2$ is the volume average pore radius determined from the low pressure scan, $w_1$ is the weight of the sample subjected to the high pressure scan, and $w_2$ is the weight of the sample subjected to the low pressure scan.

Figure 1:
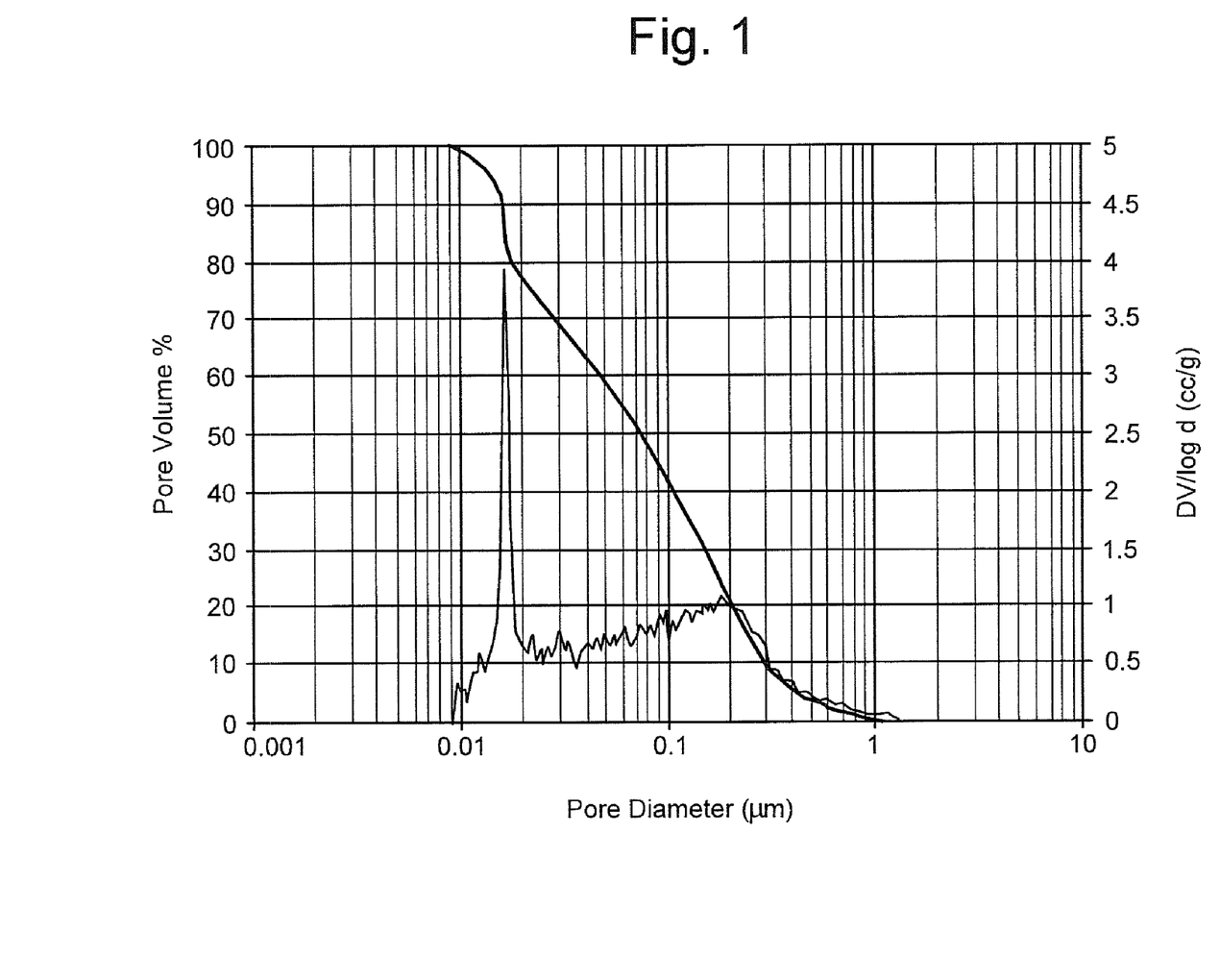
FIG. 1 is a graph of data obtained using a mercury Porosimeter which plots pore diameter to pore volume for a microporous matrix before stretch made in accordance with the teachings of the prior art.

Large pores require lower pressures for the mercury to intrude into the pore volume while smaller pores require the higher pressures for intrusion into the pore volumes. In FIG. 1, approximately 20% of the pores are smaller than 0.02 micrometers. DV/logd represents the change in pore volume with the change in log of pore diameter. Thus as can be seen from FIG. 1, there are a large number of pores that have a diameter of approximately 0.016 micrometers, and the peak height is several magnitudes higher than any other peak. In this representation, the peak areas and heights represent the relative number of pores at the corresponding log of pore diameter.

Figure 3:
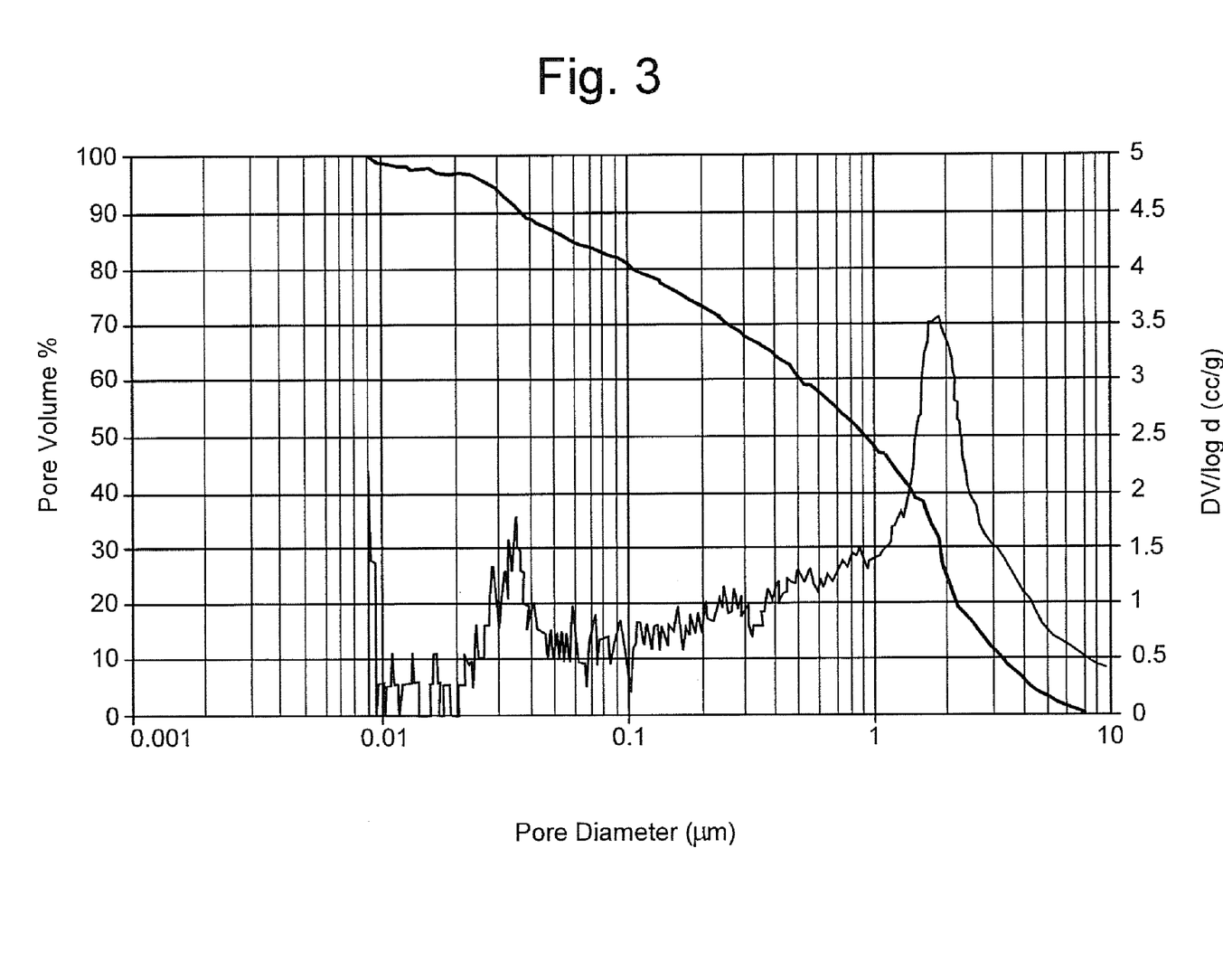
FIG. 3 is a graph of data obtained using a mercury Porosimeter which plots pore diameter to pore volume for a material made in accordance with the teachings of the prior art, where stretch is a biaxial stretch.
Figure 4:
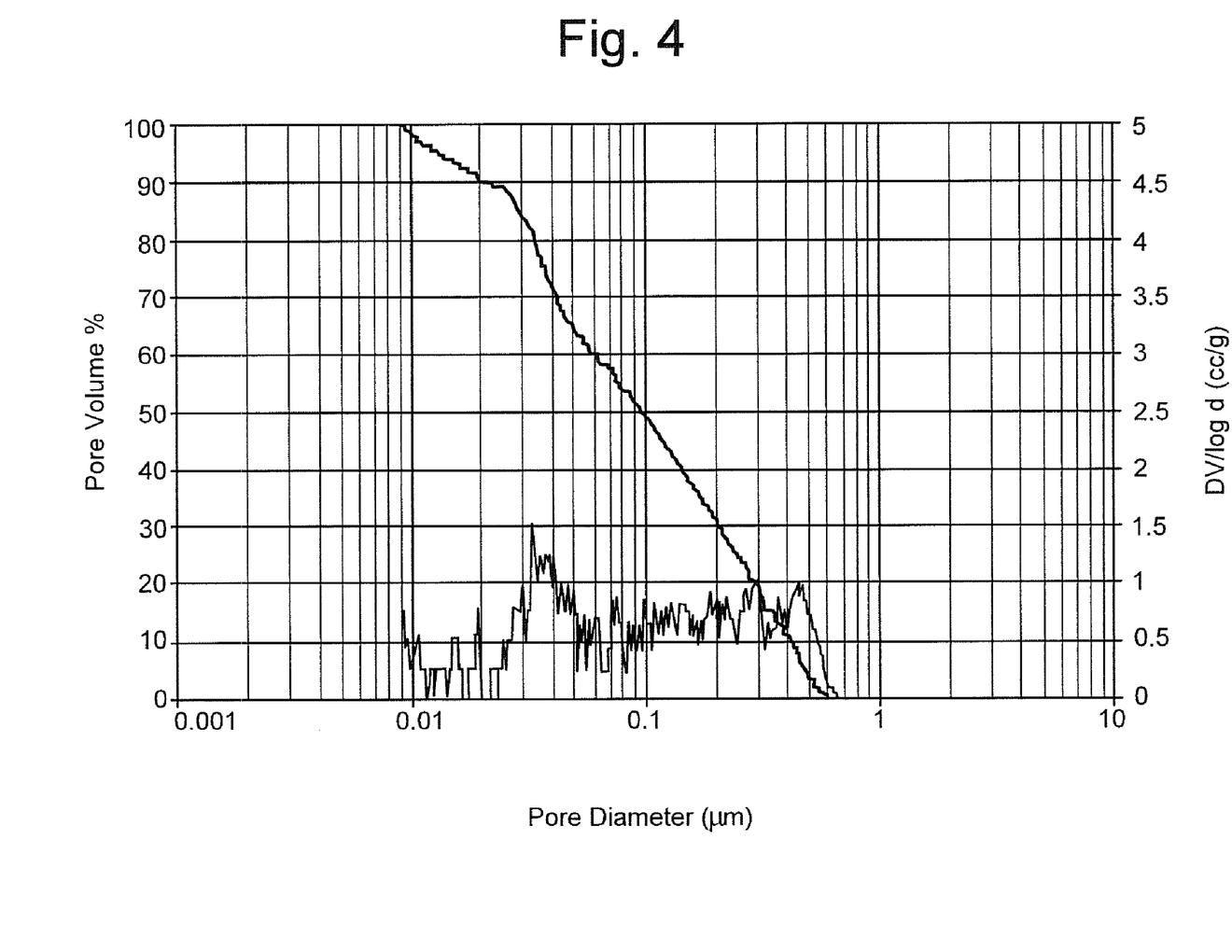
FIG. 4 is a graph of data obtained using a mercury Porosimeter which plots pore diameter to pore volume for a membrane made by the invented process, where post stretch calendering is performed at moderate pressure.

The volume average diameter of the pores of the precursor microporous matrix is usually a distribution from about 0.01 to about 1.0 micrometers, as seen in FIG. 1. By stretching the precursor material one can obtain pores which are greater than 1 micrometer in size. The resulting pore distribution of this stretched material can be seen in FIGS. 2 and 3. Depending on the amount of stretch it is possible to obtain pores greater than 20 to 30 micrometers. Then through the subsequent calendering step the pore size can be selectively reduced from the enlarged pore distribution. One example at this modified distribution of the average diameter of the pores is in the range of from about 0.01 to about 0.8 micrometers for the resulting microporous material which is stretched and calendered. In another embodiment the resulting microporous material has a distribution of average diameter of the pores of from about 0.01 to about 0.6 micrometers, as seen in FIG. 4. The volume average diameter of the pores of the microporous matrix is determined by the mercury porosimetry method.

The stretched microporous matrix may be produced by stretching the microporous matrix in at least one stretching direction to a stretch ratio of at least about 1.5. In many cases, the stretch ratio is at least about 1.7. In another embodiment it is at least about 2. Frequently, the stretch ratio is in the range of from about 1.5 to about 15. Often the stretch ratio is in the range of from about 1.7 to about 10. In another embodiment, the stretch ratio is in the range of from about 2 to about 6. As used herein and in the claims, the stretch ratio is determined by the formula:

$$S = L_2/L_1$$

where S is the stretch ratio, $L_1$ is the distance between two reference points located on the microporous matrix and on a line parallel to the stretching direction, and $L_2$ is the distance between the same two reference points located on the stretched microporous material. When the stretching is done in two directions, the stretching in the two directions may be performed either sequentially or simultaneously.

The temperatures at which stretching is accomplished may vary widely. Stretching may be accomplished at about ambient room temperature, but usually elevated temperatures are employed. The microporous matrix may be heated by any of a wide variety of techniques prior to, during, and/or after stretching. Examples of these techniques include radiative heating such as that provided by electrically heated or gas fired infrared heaters, convective heating such as that provided by recirculating hot air, and conductive heating such as that provided by contact with heated rolls. The temperatures which are measured for temperature control purposes may vary according to the apparatus used and personal preference. For example, temperature-measuring devices may be placed to ascertain the temperatures of the surfaces of infrared heaters, the interiors of infrared heaters, the air temperatures of points between the infrared heaters and the microporous matrix, the temperatures of circulating hot air at points within the apparatus, the temperature of hot air entering or leaving the apparatus, the temperatures of the surfaces of rolls used in the stretching process, the temperature of heat transfer fluid entering or leaving such rolls, or film surface temperatures. In general, the temperature or temperatures are controlled such that the microporous matrix is stretched about evenly so that the variations, if any, in film thickness of the stretched microporous matrix are within acceptable limits and so that the amount of stretched microporous matrix outside of those limits is acceptably low. It will be apparent that the temperatures used for control purposes may or may not be close to those of the microporous matrix itself since they depend upon the nature of the apparatus used, the locations of the temperature-measuring devices, and the identities of the substances or objects whose temperatures are being measured.

In view of the locations of the heating devices and the line speeds usually employed during stretching, gradients of varying temperatures may or may not be present through the thickness of the microporous matrix. Also because of such line speeds, it is impracticable to measure these temperature gradients. The presence of gradients of varying temperatures, when they occur, makes it unreasonable to refer to a singular film temperature. Accordingly, film surface temperatures, which can be measured, are best used for characterizing the thermal condition of the microporous matrix. These are ordinarily about the same across the width of the microporous matrix during stretching although they may be intentionally varied, as for example, to compensate for microporous matrix having a wedge-shaped cross-section across the sheet. Film surface temperatures along the length of the sheet may be about the same or they may be different during stretching.

The film surface temperature at which stretching is accomplished may vary widely, but in general they are such that the microporous matrix is stretched about evenly, as explained above. In most cases, the film surface temperatures during stretching are in the range of from about 20° C. to about 220° C. Often such temperatures are in the range of from about 50° C. to about 200° C. From about 75° C. to about 180° C. is another range in this embodiment.

Stretching may be accomplished in a single step or a plurality of steps as desired. For example, when the microporous matrix is to be stretched in a single direction (uniaxial stretching), the stretching may be accomplished by a single stretching step or a sequence of stretching steps until the desired final stretch ratio is attained. Similarly, when the microporous matrix is to be stretched in two directions (biaxial stretching), the stretching can be conducted by a single biaxial stretching step or a sequence of biaxial stretching steps until the desired final stretch ratios are attained. Biaxial stretching may also be accomplished by a sequence of one or more uniaxial stretching steps in one direction and one or more uniaxial stretching steps in another direction. Biaxial stretching steps where the microporous matrix is stretched simultaneously in two directions and uniaxial stretching steps may be conducted in sequence in any order. Stretching in more than two directions is within contemplation. It may be seen that the various permutations of steps are quite numerous. Other steps, such as cooling, heating, sintering, annealing, reeling, unreeling, and the like, may optionally be included in the overall process as desired.

Various types of stretching apparatus are well known and may be used to accomplish stretching of the microporous matrix according to the present invention. Uniaxial stretching is usually accomplished by stretching between two rollers wherein the second or downstream roller rotates at a greater peripheral speed than the first or upstream roller. Uniaxial stretching can also be accomplished on a standard tentering machine. Biaxial stretching may be accomplished by simultaneously stretching in two different directions on a tentering machine. More commonly, however, biaxial stretching is accomplished by first uniaxially stretching between two differentially rotating rollers as described above, followed by either uniaxially stretching in a different direction using a tenter machine or by biaxially stretching using a tenter machine. The most common type of biaxial stretching is where the two stretching directions are approximately at right angles to each other. In most cases where continuous sheet is being stretched, one stretching direction is at least approximately parallel to the long axis of the sheet (machine direction) and the other stretching direction is at least approximately perpendicular to the machine direction and is in the plane of the sheet (transverse direction).

After the microporous matrix has been stretched either uniaxially or biaxially then the stretched microporous matrix is again calendered. The stretched microporous matrix is forwarded to a pair of heated calender rolls acting cooperatively to form a membrane of lesser thickness than the microporous matrix exiting from the stretching apparatus. By regulating the pressure exerted by these calender rolls along with the temperature, the pore size of the final membrane can be controlled as desired. This allows the manufacturer to adjust the average pore size with a degree of control which heretofore has not been seen. The final pore size will affect other properties such as the Gurley value of the membrane, as well as, improving the dimensional stability of the membrane at temperatures above room temperature of 20° to 25° centigrade.

Figure 2:
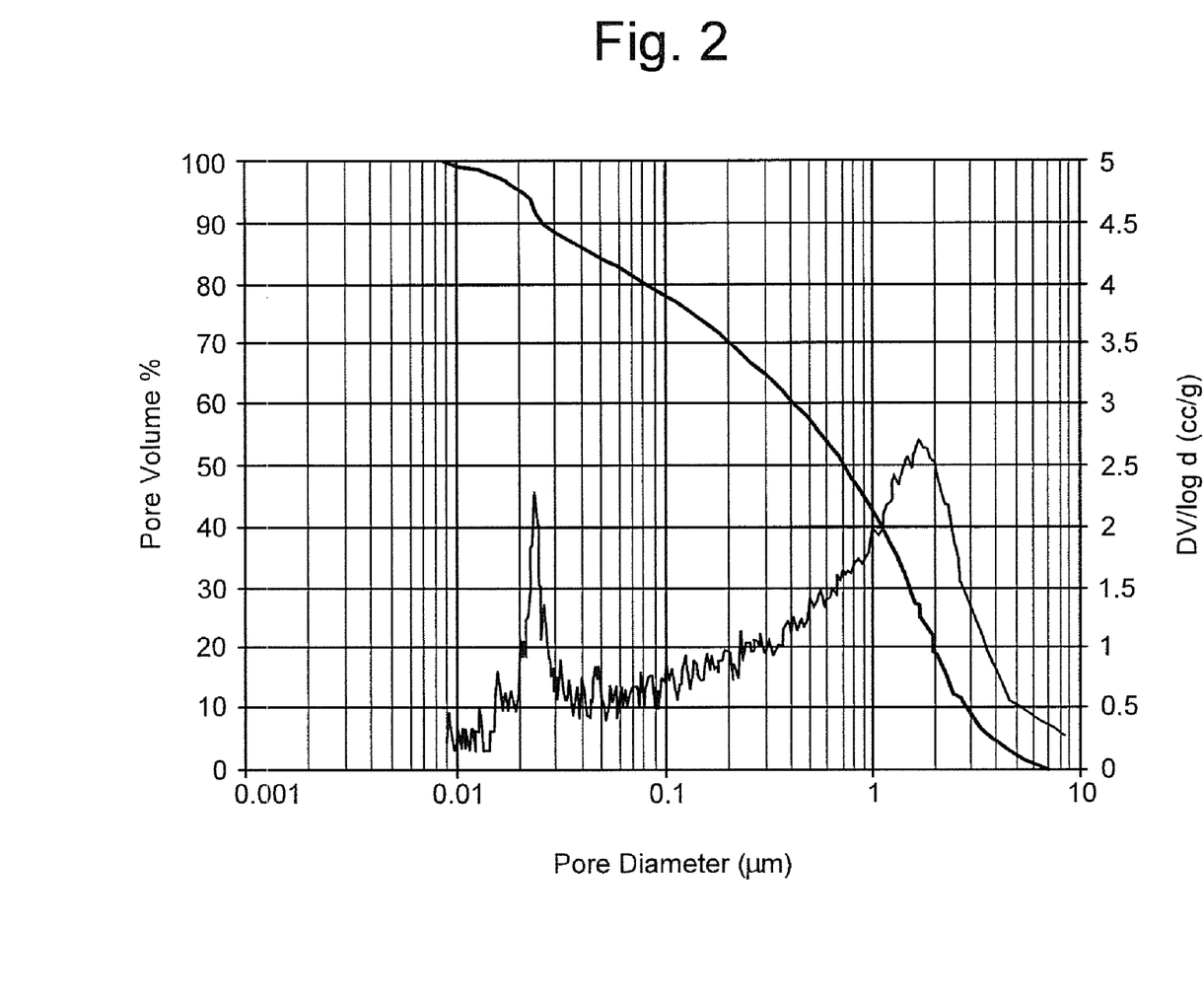
FIG. 2 is a graph of data obtained using a mercury Porosimeter which plots pore diameter to pore volume for a material made in accordance with the teachings of the prior art, where stretch is uniaxial in the machine direction.
Figure 5:
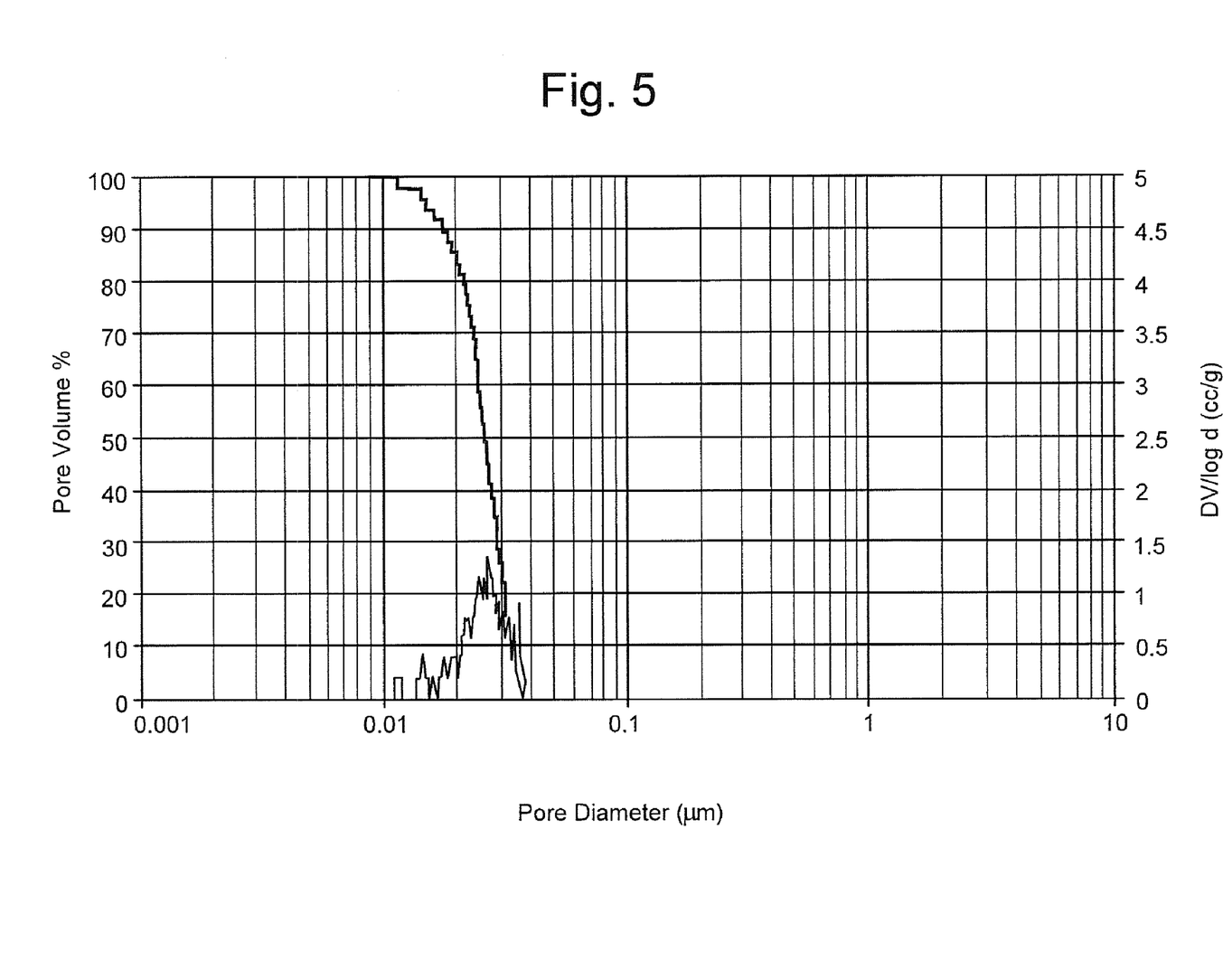
FIG. 5 is a graph of data obtained using a mercury Porosimeter which plots pore diameter to pore volume for the membrane made by the invented process, where post stretch calendering is performed at a higher compression pressure.

The figures provided are plots of data collected from mercury porosimetry. FIG. 1 is a graph showing pore diameter in micrometers for the precursor membrane extruded through a slot die and calendered, and then partially extracted of plasticizer. The resulting microporous matrix has not been stretched or subsequently calendered. FIG. 2 is a graph showing pore diameter in micrometers for a membrane stretched uniaxially 400% in the machine direction. FIG. 3 is a graph showing pore diameter in micrometers for a membrane biaxially stretched. FIG. 4 is a graph showing pore diameter in micrometers for a membrane biaxially stretched and subsequently calendered through a gap of 25 micrometers. FIG. 5 is a graph showing pore diameter in micrometers for a membrane biaxially stretched and subsequently calendered at a high compression pressure through a minimal gap. These figures show that compression substantially changes the pore size distribution which is present in the material. Also, it is possible to adjust the pore size distribution by adjusting the compression conditions.

The final membrane is the result of stretching a precursor material and subsequently compressing it to have at least a 5% reduction in thickness of the stretched precursor material, which is defined above as the microporous matrix. This microporous material consists essentially of (or comprises): an ultrahigh molecular weight polyethylene (UHMWPE) and a particulate filler distributed throughout the microporous material, where the filler constitutes from about 5 percent to 95 percent by weight of the microporous material. The microporous material has a network of interconnecting pores communicating throughout the microporous material, the pores constituting at least 25 percent by volume of the microporous material. The microporous material has a tensile strength in the machine direction (MD) of greater than 20 $N/mm^2$; the microporous material also has a wet out time of less than 180 seconds when silica is used as the filler. It has been observed that this microporous material has an electrical resistance of less than 130 mohm/$mm^2$.

A microporous material where the microporous material consists essentially of: (or comprises) an ultrahigh molecular weight polyethylene (UHMWPE) and a particulate filler distributed throughout the microporous material, where the filler constitutes from about 5 percent to 95 percent by weight of the microporous material. The microporous material has a network of interconnecting pores communicating throughout the microporous material, with the pores constituting at least 25 percent by volume of the microporous material. This microporous material has no pores greater in size than 1.0 micrometers; and where change in volume divided by log d for the pores of this microporous material is less than 2 cc/g.

The resulting microporous material which has been both stretched and calendered exhibits shrink in the machine direction of less than 10% and has tensile strength of greater than 25 $N/mm^2$ in the machine direction (MD).

The microporous material described above can also include a second polymer. The UHMWPE is mixed with a high density (HD) polyethylene to produce a polyolefin mixture, where the polyolefin mixture has at least 50% UHMWPE by weight. The filler used with this polyolefin mixture is in a range of from about 1:9 to about 15:1 filler to polyolefin mixture by weight. The resulting matrix consists essentially of (or comprises) UHMWPE and HD polyethylene and the particulate filler distributed throughout the matrix. This microporous material has a machine direction (MD) tensile strength of greater than 25 $N/mm^2$.

With higher compression after the stretch the resulting microporous material consists essentially of: (or comprises) an ultrahigh molecular weight polyethylene (UHMWPE) and a particulate filler distributed throughout the microporous material, where the filler constitutes from about 5 percent to 95 percent by weight of the microporous material. The microporous material has a network of interconnecting pores communicating throughout the microporous material, with the pores constituting at least 25 percent by volume of the microporous material. Since the compression pressure determines the resulting pore size distribution, the pore structure is highly adjustable. For instance, this microporous material in FIG. 4 has no pores greater in size than 0.50 micrometers. The median pore size is between or equal to 0.01 and 0.3 micrometers and the pores vary in size by plus or minus 0.2 micrometers.

The resulting microporous material which has been both stretched and calendered exhibits shrink in the machine direction of less than 10% and has tensile strength of greater than 25 N/mm$^2$ in the machine direction (MD).

The microporous material described above can also include a second polymer. The UHMWPE is mixed with a high density (HD) polyethylene to produce a polyolefin mixture, where the polyolefin mixture has at least 50% UHMWPE by weight. The filler used with this polyolefin mixture is in a range of from about 1:9 to about 15:1 filler to polyolefin mixture by weight. The resulting matrix comprises (or consists essentially of) UHMWPE and HD polyethylene and the particulate filler distributed throughout the matrix. This microporous material has a machine direction (MD) tensile strength of greater than 25 N/mm$^2$.

A process for improving the wet out time of an uncoated microporous membrane was developed comprising the steps of: providing an ultrahigh molecular weight polyethylene (UHMWPE); providing a particulate silica filler; providing a processing plasticizer where said processing plasticizer may be a liquid at room temperature. Then mixing UHMWPE, filler and processing plasticizer together to form a mixture, having a weight ratio of filler to UHMWPE of from 1:9 to 15:1 by weight. The mixture is then extruded to form a sheet. The sheet is then processed, where processing is selected from the group consisting of: calendering, casting or blowing. The processed sheet then undergoes an extraction step where all or part of the processing plasticizer is extracted from the sheet to produce a microporous matrix sheet which comprises UHMWPE and the particulate filler. In this matrix the filler is distributed throughout the matrix. The microporous matrix sheet is then calendered to produce a microporous membrane with a reduction in thickness of at least 5%. The resulting microporous membrane typically exhibits a reduction in wet out time of 50% or more over said microporous matrix sheet without the use of any chemical surface coating treatments.

Additionally a process for improving the wet out time of an uncoated microporous membrane comprising the steps of: providing an ultrahigh molecular weight polyethylene (UHMWPE); providing a particulate silica filler; providing a processing plasticizer where said processing plasticizer may be a liquid at room temperature. Then mixing UHMWPE, filler and processing plasticizer together to form a mixture, having a weight ratio of filler to UHMWPE of from 1:9 to 15:1 by weight. The mixture is then extruded to form a sheet. The sheet is then processed, where processing is selected from the group consisting of: calendering, casting or blowing. The processed sheet then undergoes an extraction step where all or part of the processing plasticizer is extracted from the sheet to produce a microporous matrix sheet which comprises UHMWPE and the particulate filler. In this matrix the filler is distributed throughout the matrix. The microporous matrix sheet is then stretched in at least one stretching direction to a stretch ratio of at least about 1.5 to produce a stretched microporous matrix sheet. This stretched microporous matrix sheet is then calendered to produce a microporous membrane with a reduction in thickness of at least 5%. Where the resulting microporous membrane, typically exhibits a reduction in wet out time of 50% or more over the microporous matrix sheet without the use of any chemical surface coating treatments.

Test Procedures

Thickness—The membrane thickness values are reported in units of micrometers (μm) and were measured using ASTM D374.

Puncture Strength—The units of puncture strength are newtons and the test procedure was ASTM D3763.

Tensile Strength—Tensile strength was measured using ASTM D882 and the units are N/mm2.

Electrical Resistance—The units of electrical resistance are mohm-cm$^2$.

Shrink Testing—Both MD and TD shrink values were measured using a modified version of ASTM D4802. The samples were cut into 5 inch (12.7 cm) squares and put into an oven for 10 minutes at 100° C. The units are percentage of change from the original dimension.

Basis Weight—Basis weight was determined using ASTM D3776 and the units are grams per square meter.

Hg porosity—This was measured using Hg intrusion porosimetry.

Gurley—The units are sec/10 cc and were measured by TAPPI T536 method.

Wetout Time—A visual technique whereas a sample is gently placed (not immersed) on the surface of water, and the time (in seconds) it takes for the membrane to begin to darken is called the wetout time.

Equipment—Calendering rolls used in these tests were stack rolls having a diameter of 8 inches or 20.3 centimeters.

As can be seen from the Examples which follow, the resulting stretched then calendered microporous material exhibits improved dimensional stability properties over a membrane which has only been stretched.

EXAMPLES

Example A is membrane containing the following:

| Example A | Polymer UHMWPE | Filler SiO2 | Plasticizer | Minors | Ratio Filler-Polymer |
|---|---|---|---|---|---|
| Extrusion | 9.6% | 25.0% | 64.0% | 1.4% | 2.6 |
| Extraction | 23.5% | 61.1% | 12.0% | 1.4% | 2.6 |

Now taking the material from Example A additional samples were prepared using tenter frame equipment. This equipment allows for both uniaxial and biaxial stretching. The following parameters were used to produce these samples:

TABLE 1

Stretched Membrane Characteristics

| Sample # | Net Stretch % | Backweb (μm) | Puncture (N) | Modulus-MD (MPa) | Tensile-MD (N/mm$^2$) | Elongation MD % |
|---|---|---|---|---|---|---|
| A-10 | 300 | 173 | 6.7 | 71.2 | 11.9 | 23 |
| A-11 | 300 | 173 | 8.3 | 69.6 | 14.1 | 27 |

TABLE 1-continued

Stretched Membrane Characteristics

| Sample # | Net Stretch % | Backweb (μm) | Puncture (N) | Modulus-MD (MPa) | Tensile-MD (N/mm²) | Elongation MD % |
|---|---|---|---|---|---|---|
| A-12 | 400 | 147 | 9.9 | 170.8 | 29.9 | 21 |
| A-13 | 400 | 144 | 7.9 | 96.1 | 18.5 | 22 |
| A-14 | 500 | 124 | 7.4 | 261.1 | 34.3 | 17 |
| A-15 | 500 | 120 | 7.3 | 146.3 | 24.0 | 19 |
| A-16 | 300 | 159 | 9.9 | 101.8 | 23.3 | 40 |
| A-17 | 400 | 150 | 11.4 | 149.5 | 31.3 | 28 |
| A-18 | 300 × 350 | 80 | 3.3 | 23.5 | 4.6 | 21 |
| A-19 | 200 × 350 | 106 | 5.7 | 27.3 | 11.2 | 54 |

A-18 and A-19 samples were biaxially stretched and produced using a sequential stretching device. The other samples refer to stretched membranes in the MD direction (uniaxial) only.

TABLE 2

Stretched Membrane Characteristics (Continued)

| Sample # | Modulus-TD (MPa) | Tensile-TD (N/mm²) | Elongation-TD % | Shrinkage-MD % | Shrinkage-TD % | Basis wt (gsm) | Gurley (sec/100 cc) |
|---|---|---|---|---|---|---|---|
| A-10 | 10.6 | 3.7 | 204 | −3.9 | <1 | 59.5 | 58.8 |
| A-11 | 8.6 | 3.9 | 229 | −3.9 | <1 | 58.7 | 56.0 |
| A-12 | 7.1 | 3.7 | 303 | −11 | <1 | 45.8 | 119.6 |
| A-13 | 8.8 | 3.4 | 205 | −3 | <1 | 47.5 | 59.4 |
| A-14 | 6.3 | 2.8 | 244 | −7 | <1 | 38.3 | 90.2 |
| A-15 | 7.4 | 3.2 | 219 | −2.3 | <1 | 41.7 | 53.4 |
| A-16 | 11.6 | 3.9 | 234 | −10.7 | −0.2 | 55.8 | 96.3 |
| A-17 | 8.7 | 3.4 | 230 | −12.3 | −0.3 | 47.6 | 86.7 |
| A-18 | 21.3 | 6.2 | 35 | −32 | −44 | 15.6 | 15.4 |
| A-19 | 19.6 | 8.3 | 54 | −37 | −44 | 20.5 | 36.8 |

TABLE 3

Stretched/Compressed Membrane Conditions and Characteristics

| Sample # | Calender Gap μm | Calender Pressure | Temp °C. | Thickness μm | Puncture N | Tensile MD N/mm2 | Tensile TD N/mm2 |
|---|---|---|---|---|---|---|---|
| A-16-F | 0 | Full | 110 | 53.3 | 9.1 | 72.9 | 12.1 |
| A-17-F | 0 | Full | 110 | 48.3 | 10.4 | 86.0 | 11.5 |
| A-16-M | 25 | Moderate | 110 | 76.2 | 9.6 | 52.6 | 8.8 |
| A-17-M | 25 | Moderate | 110 | 71.1 | 10.5 | 77.4 | 10.5 |
| A-16-S | 100 | Slight | 110 | 149.9 | 10.1 | 26.9 | 4.3 |
| A-17-S | 100 | Slight | 110 | 142.2 | 10.8 | 31.4 | 3.7 |
| A-16-F | 0 | Full | 135 | 55.9 | 10.5 | 74.8 | 14.2 |
| A-17-F | 0 | Full | 135 | 53.3 | 11.1 | 90.1 | 14.2 |
| A-16-M | 25 | Moderate | 135 | 86.4 | 10.1 | 26.3 | 5.4 |
| A-17-M | 25 | Moderate | 135 | 78.7 | 10.9 | 39.8 | 5.8 |
| A-16-S | 100 | Slight | 135 | 157.5 | 9.6 | 24.7 | 4.2 |
| A-17-S | 100 | Slight | 135 | 149.9 | 10.8 | 28.3 | 4.2 |
| A-18-F | 0 | Full | 121 | 17.8 | 4.3 | 41.6 | 42.0 |
| A-18-M | 20 | Moderate | 121 | 22.9 | 3.3 | 28.5 | 28.2 |
| A-19-F | 0 | Full | 121 | 20.3 | 8.2 | 64.9 | 54.9 |
| A-19-M | 20 | Moderate | 121 | 30.5 | 7.0 | 47.6 | 34.0 |

TABLE 4

Stretched/Compressed Membrane Characteristics (Continued)

| Sample # | Elongation-MD % | Elongation-TD % | Shrinkage-MD % | Shrinkage-TD % | Wetout Time sec |
|---|---|---|---|---|---|
| A-16-F | 47 | 195 | −0.5 | 0.9 | 18.0 |
| A-17-F | 34 | 193 | −0.5 | 1.0 | 18.0 |
| A-16-M | 52 | 222 | −2.6 | 0.1 | 41.0 |
| A-17-M | 39 | 244 | −1.4 | 0.3 | 42.0 |
| A-16-S | 46 | 208 | −6.5 | −0.2 | 115.0 |
| A-17-S | 31 | 242 | −7.0 | −0.3 | 160.0 |
| A-16-F | 51 | 188 | −0.1 | 0.9 | 20.5 |
| A-17-F | 36 | 221 | −0.4 | 0.8 | 18.5 |
| A-16-M | 46 | 207 | −0.9 | 0.1 | 52.0 |
| A-17-M | 36 | 235 | −1.3 | −0.1 | 46.5 |
| A-16-S | 56 | 208 | −6.5 | −0.2 | 79.5 |
| A-17-S | 39 | 261 | −7.0 | −0.3 | 41.0 |
| A-18-F | 26 | 35 | −0.8 | 0.0 | 4.5 |
| A-18-M | 24 | 50 | −3.2 | −4.6 | 9.0 |
| A-19-F | 50 | 47 | 0.2 | 0.1 | 2.5 |
| A-19-M | 52 | 67 | −2.4 | −1.6 | 9.0 |

Wetout times for uncalendered A-16, A-17, A-18 and A-19 were not obtained and found to be much greater than 10 minutes.

From the data presented in these Tables, several advantages can be seen with the present process compared to the prior art. First, the stretched and then calendered films have greatly improved dimensional stability, even at elevated temperatures. The thickness which can be achieved by the stretching process alone is limited and thinner membranes can be achieved by calendering the membrane after stretching. Physical strength is much improved after the calendering of a stretched microporous material. Finally, the calendering process reduces the pore size and various degrees of calendering can be used to adjust to the desired pore size.

The present invention may be embodied in other forms without departing from the spirit and the essential attributes thereof, and, accordingly, reference should be made to the appended claims, rather than to the foregoing specification, as indicated the scope of the invention.

What is claimed is:

1. A method for producing a microporous material comprising the steps of:
   mixing ultra high molecular weight polyethylene (UHMWPE), filler and processing plasticizer together to form a mixture, having a weight ratio of filler to UHMWPE of from 1:9 to 15:1 by weight;
   extruding said mixture to form a sheet;
   calendering said sheet;
   extracting all or part of said processing plasticizer from said sheet to produce a matrix comprising UHMWPE and said particulate filler, the filler being distributed throughout said matrix, to produce a microporous matrix sheet;
   stretching said microporous matrix sheet in at least one stretching direction to a stretch ratio of at least about 1.5 to produce a stretched microporous matrix sheet; and
   calendering said stretched microporous matrix sheet.

2. The method for producing a microporous material having improved physical and dimensional stability properties according to claim 1 where said processing plasticizer is substantially removed from said sheet in the extracting step, with an organic extraction liquid which is a good solvent for said processing plasticizer, a poor solvent for the polymer, and more volatile than said processing plasticizer; where any residual organic extraction liquid is substantially removed by: heat; steam; and/or water; and where any residual water and remaining residual organic extraction liquid are substantially removed by drying prior to stretching said microporous matrix.

3. The method for producing a microporous material according to claim 1 where said filler is selected from the group consisting essentially of: silica, mica, montmorillonite, kaolinite, asbestos, talc, diatomaceous earth, vermiculite, natural and synthetic zeolites, cement, calcium silicate, clay, aluminum silicate, sodium aluminum silicate, aluminum polysilicate, alumina silica gels, glass particles, carbon black, activated carbon, carbon fibers, charcoal, graphite, titanium oxide, iron oxide, copper oxide, zinc oxide, lead oxide, tungsten, antimony oxide, zirconia, magnesia, alumina, molybdenum disulfide, zinc sulfide, barium sulfate, strontium sulfate, calcium carbonate, and magnesium carbonate.

4. The method for producing a microporous material according to claim 3 where said filler is selected from the group consisting essentially of: silica, precipitated silica, silica gel, fumed silica, mica, talc, diatomaceous earth, carbon black, activated carbons, carbon fibers, titanium oxide and calcium carbonate.

5. The method for producing a microporous material according to claim 1 where said microporous matrix sheet is stretched biaxially which has a stretch ratio in both stretching directions of at least about 1.5.

6. The method for producing a microporous material according to claim 5 where said processing plasticizer is substantially removed from said sheet in the extracting step, with an organic extraction liquid which is a good solvent for said processing plasticizer, a poor solvent for the polymer, and more volatile than said processing plasticizer; where any residual organic extraction liquid is substantially removed by: heat; steam; and/or water; and where any residual water and remaining residual organic extraction liquid are substantially removed by drying prior to stretching said microporous matrix.

7. The method for producing a microporous material according to claim 1 where said UHMWPE is mixed with a high density (HD) polyethylene to produce a polyolefin mixture, where said polyolefin mixture has at least 50% UHMWPE by weight of said polyolefin mixture; where said filler to said polyolefin mixture is in a range of from 1:9 to 15:1 filler to polyolefin mixture by weight and where said matrix comprises UHMWPE and HD polyethylene and said particulate filler distributed throughout said matrix.

8. A method for producing a microporous material comprising the steps of:
   mixing ultra high molecular weight polyethylene (UHMWPE), filler and processing plasticizer together to form a mixture, having a weight ratio of filler to UHMWPE of from 1:9 to 15:1 by weight;
   extruding said mixture to form a sheet;
   calendering said sheet;
   extracting all or part of said processing plasticizer from said sheet to produce a matrix comprising UHMWPE and said particulate filler, the filler being distributed throughout said matrix, to produce a microporous matrix sheet;
   stretching said microporous matrix sheet in at least one stretching direction to a stretch ratio of at least about 1.5 to produce a stretched microporous matrix sheet; and
   calendering said stretched microporous matrix sheet;
   wherein said microporous matrix sheet having a thickness of no greater than 53.3 microns and a tensile strength in the machine direction of at least 72.9 N/mm$^2$.

9. The method for producing a microporous material according to claim 8 where said filler is selected from the group consisting essentially of: silica, mica, montmorillonite, kaolinite, asbestos, talc, diatomaceous earth, vermiculite, natural and synthetic zeolites, cement, calcium silicate, clay, aluminum silicate, sodium aluminum silicate, aluminum polysilicate, alumina silica gels, glass particles, carbon black, activated carbon, carbon fibers, charcoal, graphite, titanium oxide, iron oxide, copper oxide, zinc oxide, lead oxide, tungsten, antimony oxide, zirconia, magnesia, alumina, molybdenum disulfide, zinc sulfide, barium sulfate, strontium sulfate, calcium carbonate, and magnesium carbonate.

10. The method for producing a microporous material according to claim 9 where said filler is selected from the group consisting essentially of: silica, precipitated silica, silica gel, fumed silica, mica, talc, diatomaceous earth, carbon black, activated carbons, carbon fibers, titanium oxide and calcium carbonate.

11. The method for producing a microporous material according to claim 8 where said microporous matrix sheet is stretched biaxially which has a stretch ratio in both stretching directions of at least about 1.5.

12. The method for producing a microporous material according to claim 8 where said UHMWPE is mixed with a high density (HD) polyethylene to produce a polyolefin mixture, where said polyolefin mixture has at least 50% UHMWPE by weight of said polyolefin mixture; where said filler to said polyolefin mixture is in a range of from 1:9 to 15:1 filler to polyolefin mixture by weight and where said matrix comprises UHMWPE and HD polyethylene and said particulate filler distributed throughout said matrix.

13. A method for producing a microporous material comprising the steps of:
mixing ultra high molecular weight polyethylene (UHMWPE), filler and processing plasticizer together to form a mixture, having a weight ratio of filler to UHMWPE of from 1:9 to 15:1 by weight;
extruding said mixture to form a sheet;
calendering said sheet;
extracting all or part of said processing plasticizer from said sheet to produce a matrix comprising UHMWPE and said particulate filler, the filler being distributed throughout said matrix, to produce a microporous matrix sheet;
stretching said microporous matrix sheet in at least one stretching direction to a stretch ratio of at least about 1.5 to produce a stretched microporous matrix sheet; and
calendering said stretched microporous matrix sheet;
wherein said microporous matrix sheet having a thickness of no greater than 30.5 microns and a tensile strength in the machine direction of at least 47.6 N/mm$^2$.

14. The method for producing a microporous material according to claim 13 where said filler is selected from the group consisting essentially of: silica, mica, montmorillonite, kaolinite, asbestos, talc, diatomaceous earth, vermiculite, natural and synthetic zeolites, cement, calcium silicate, clay, aluminum silicate, sodium aluminum silicate, aluminum polysilicate, alumina silica gels, glass particles, carbon black, activated carbon, carbon fibers, charcoal, graphite, titanium oxide, iron oxide, copper oxide, zinc oxide, lead oxide, tungsten, antimony oxide, zirconia, magnesia, alumina, molybdenum disulfide, zinc sulfide, barium sulfate, strontium sulfate, calcium carbonate, and magnesium carbonate.

15. The method for producing a microporous material according to claim 13 where said filler is selected from the group consisting essentially of: silica, precipitated silica, silica gel, fumed silica, mica, talc, diatomaceous earth, carbon black, activated carbons, carbon fibers, titanium oxide and calcium carbonate.

16. The method for producing a microporous material according to claim 13 where said microporous matrix sheet is stretched biaxially which has a stretch ratio in both stretching directions of at least about 1.5.

17. The method for producing a microporous material according to claim 13 where said UHMWPE is mixed with a high density (HD) polyethylene to produce a polyolefin mixture, where said polyolefin mixture has at least 50% UHMWPE by weight of said polyolefin mixture; where said filler to said polyolefin mixture is in a range of from 1:9 to 15:1 filler to polyolefin mixture by weight and where said matrix comprises UHMWPE and HD polyethylene and said particulate filler distributed throughout said matrix.

\* \* \* \* \*